United States Patent [19]

Kruger

[11] Patent Number: 4,803,490

[45] Date of Patent: Feb. 7, 1989

[54] HORIZON STABILIZED ANTENNA BEAM FOR SHIPBOARD RADAR

[75] Inventor: Bradford E. Kruger, Woodland Hills, Calif.

[73] Assignee: ITT Gilfillan, A Division of ITT Corporation, Van Nuys, Calif.

[21] Appl. No.: 665,275

[22] Filed: Oct. 26, 1984

[51] Int. Cl.⁴ ........................ G01S 13/46; H01Q 3/46; H01Q 1/34

[52] U.S. Cl. ........................ 342/158; 342/75; 342/359; 342/376; 343/709

[58] Field of Search ................ 343/7.4, 7 A, 427, 438, 343/429, 709, 754, 767; 342/75, 77, 81, 376, 359, 158

[56] References Cited

U.S. PATENT DOCUMENTS 3,017,630 1/1962 Begovich et al. .................. 343/428

4,042,931 8/1977 Gustafsson .......................... 343/427

*Primary Examiner*—Theodore M. Blum

*Assistant Examiner*—Gilberto Barrón, Jr.

*Attorney, Agent, or Firm*—Robert A. Walsh; Thomas N. Twomey; Mary C. Werner

[57] ABSTRACT

A shipboard search radar in which an antenna beam is stepped up and down in elevation to keep the beam pointed approximately toward the horizon even though the ship may be rolling and/or pitching.

3 Claims, 1 Drawing Sheet

HORIZON STABILIZED ANTENNA BEAM FOR SHIPBOARD RADAR

BACKGROUND OF THE INVENTION

This invention relates to a shipboard radar system in which the antenna beam thereof is normally moved with the pitch and/or roll of the ship, and more particularly to an arrangement for automatically causing the beam to be directed toward the horizon as a function of the pitch and roll angles.

PRIOR ART STATEMENT

Historically, shipboard radars have often been unstabilized. That is, as the ship carrying the radar pitches and rolls, the position of the peak of the radar beam is directly modulated by that pitch and roll in addition to the continuous antenna rotation in search. Two dimensional radars of this type have typically had fat elevation beams so that horizon and high angle coverage occasionally is lost only under conditions of extreme (±25°) pitch and roll.

Two dimensional radars with higher gain antennas require horizon stabilization of the peak of the beam. This is achieved by mechanically rocking the antenna structure back and forth on one axis to compensate for ship's motion. This is basically roll stabilization. Some two dimensional radars are fully stabilized; i.e., both pitch and roll are compensated for so that radar operation is effectively decoupled from ship movement.

These radars are mechanically stablized, an approach required for simple reflector-type antennas. However, this increases the radar's topside weight and complexity because one (or two) bearings, drive motors, sets of gears, etc., are required for stabilization. Basic radar system reliability is thereby limited.

Ideally, a radar should be stabilized electronically. For example, one prior art radar is stabilized in both axes, but must be a phased array in order for that to be accomplished. Another prior art radar is horizon stabilized, but requires the use of elevation frequency scan to accomplish that function. Phase scan in elevation would also permit horizon beam stabilization of a rotating array antenna.

SUMMARY OF THE INVENTION

In accordance with the system of the present invention, the above-described and other disadvantages of the prior art are overcome by providing a Rotman lens for a shipboard radar, and means for shifting the antenna beam in accordance with the outputs of pitch and roll sensors.

In accordance with the present invention, a less expensive way of electronically roll stabilizing a rotating array antenna is provided. If the array is fed in the elevation plane by a Rotman lens, an approximation of horizon stabilization may be obtained by switching input ports (which selects different beam positions) as the antenna rotates and the ship pitches and rolls. The accuracy of horizon stabilization is determined by the number of input ports; i.e., the granularity of beam position switching. For example, as the ship rolls and starts depressing the beam below the horizon by $K_1$ degrees, the next higher beam position is selected. This stepping continues until the ship's roll/antenna azimuth position starts raising the beam. Then the process is reversed whenever the beam is $K_2$ degrees above the horizon.

This approach is particularly appealing for two dimensional radars since a Rotman Lens can be used at several input ports simultaneously to form a cosecant or cosecent squared fan beam.

BRIEF DESCRIPTION OF THE DRAWINGS

In the accompanying drawings which illustrate an exemplary embodiment of the present invention.

DESCRIPTION OF THE PREFERRED EMBODIMENT

Figure 1:
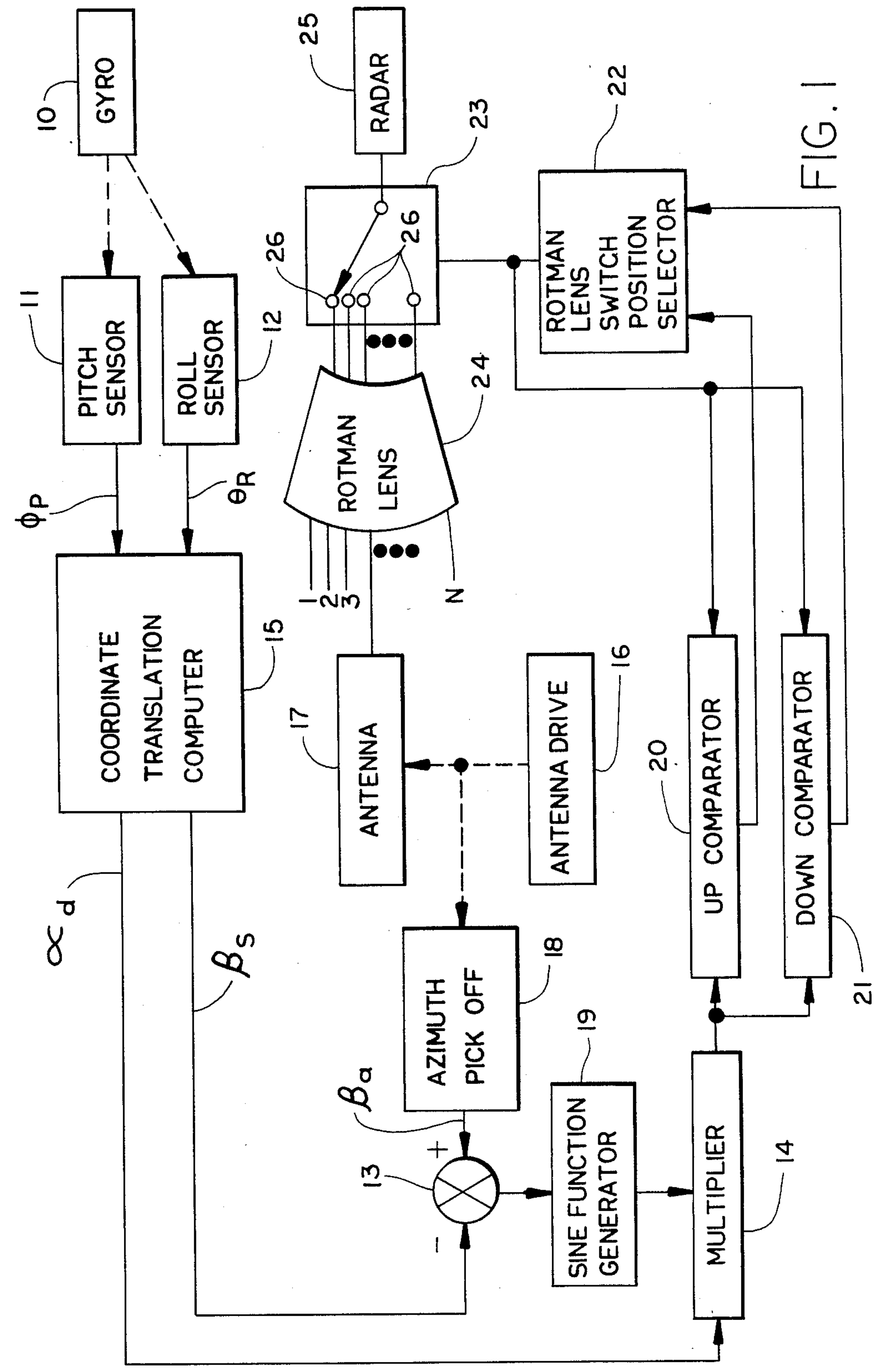
FIG. 1 is a block diagram of one embodiment of the present invention.

In FIG. 1, a ship's gyro is shown at 10 having a pitch sensor 11 and a roll sensor 12 connected therefrom.

The output of pitch sensor 11 is a signal proportional to pitch angle $\theta_p$. The output of roll sensor 12 is a signal proportional to roll angle $\theta_r$.

Also shown in FIG. 1 is a subtractor 13 and a multiplier 14. A coordinate translation computer 15 is connected from sensors 11 and 12 and converts $\theta_p$ and $\theta_r$ to $\alpha_d$ and $\beta_s$. $\alpha_d$ may be called the dip angle of the deck. $\beta_s$ may be called the strike angle of the deck. The dip angle is the deck slope. The strike angle is the azimuth angle at which the deck slopes.

A signal proportional to $\alpha_d$ is impressed upon one input of multiplier 14 by computer 15. A signal proportional to $\beta_s$ is impressed upon one input of subtractor 13 by computer 15.

An antenna drive 16 rotates an antenna 17 in search. Simultaneously therewith an azimuth pick-off 18 is rotated to impress a signal on subtractor 13 proportional to the azimuth angle $\beta_a$ of antenna 17.

A sine function generator 19 is connected from subtractor 13 to receive a signal proportional to $(\beta_a-\beta_s)$, and to produce an output signal proportional to sin $(\beta_a-\beta_s)$ which is impressed as a second input on multiplier 14.

The output of multiplier 14 is impressed upon both of two comparators, i.e., an up comparator 20 and a down comparator 21. Both comparators receive a feedback input from the output of a Rotman lens switch position selector 22.

Up and down comparators 20 and 21 each have an output lead connected to selector 22 to operate an electronic switch 23 to shift the beam of antenna 17 in steps in elevation. The output of up comparator 20 shifts the beam up. The output of down comparator 21 shifts the beam down. Shifting of the beam is accomplished via a Rotman lens 24. Radar 25 is connected to Rotman lens 24 via switch 23 and input ports 26.

The purpose of computer 15, pick-off 18, subtractor 13, sine function generator 19 and multiplier 14 is to convert the output of computer 15 to a sine function of $(\beta_a-\beta_s)$ so as to eliminate or reduce any output from multiplier 14 when $\beta_a>0$. This is true because no beam elevation correction is needed, for example, when there is a roll or combined roll and pitch normal to boresite.

What is claimed is:

1.

A shipboard radar system for search, said system comprising:

a gyro;

a pitch sensor connected with said gyro to produce an output signal which is a function of the ship's pitch;

a roll sensor connected with said gyro to produce an output signal which is a function of the ship's roll;

an antenna to radiate a beam of electromagnetic energy;

a Rotman lens actuable to move said beam in elevation;

main means responsive to said pitch and roll sensor output signals to control said Rotman lens in a manner to keep said beam pointed toward the horizon, a coordinate translation computer connected to receive said pitch and roll sensor output signals for producing output signals proportional to the deck dip and strike angles;

second means to rotate said antenna in azimuth, an azimuth angle pick-off, said second means rotating said pick-off with said antenna;

a sine function generator;

a subtractor connected to receive said strike angle output signal of said coordinate translation computer and to receive said pick-off output signal for supplying an input to said sine function generator; and a multiplier connected to receive said dip angle output signal of said coordinate translation computer and connected to receive the output signal of said sine function generator, the output signal of said multiplier being proportional to the elevation of said antenna beam relative to said gyro independent of a component of said strike angle in the direction of boresite.

2. The invention as defined in claim 1, wherein third means are provided to step said beam up a first increment in elevation when it falls first predetermined amount below the horizon, and wherein fourth means are provided to step said beam down a second increment in elevation when it rises above the horizon a second predetermined amount.

3. The invention as defined in claim 2, wherein a Rotman lens having plural ports is provided, a radar transceiver, an electronic switch for connecting said transceiver to said antenna to propagate electromagnetic energy in a beam of a predetermined elevation, a switch position selector connected to said electronic switch, said third and fourth means including up and down comparators, respectively, said up and down comparators each having one input from said multiplier and a second input from the output of said switch position selector, said up and down comparators each having an output connected to said switch position selector.

* * * * *